(12) United States Patent
James

(10) Patent No.: US 10,174,471 B2
(45) Date of Patent: *Jan. 8, 2019

(54) CABLE-BARRIERS

(71) Applicant: VALMONT HIGHWAY TECHNOLOGY LIMITED, Auckland (NZ)

(72) Inventor: Dallas James, Auckland (NZ)

(73) Assignee: VALMONT HIGHWAY TECHNOLOGY LIMITED, Auckland (NZ)

( * ) Notice: Subject to any disclaimer, the term of this patent is extended or adjusted under 35 U.S.C. 154(b) by 458 days.

This patent is subject to a terminal disclaimer.

(21) Appl. No.: 14/341,520

(22) Filed: Jul. 25, 2014

(65) Prior Publication Data

US 2015/0001454 A1 Jan. 1, 2015

Related U.S. Application Data

(63) Continuation of application No. 12/299,512, filed as application No. PCT/NZ2007/000099 on May 4, 2007.

(30) Foreign Application Priority Data

May 4, 2006 (NZ) ........................................ 546970

(51) Int. Cl.
*E01F 15/06* (2006.01)

(52) U.S. Cl.
CPC ............. *E01F 15/06* (2013.01); *Y10T 403/11* (2015.01)

(58) Field of Classification Search
CPC ....... E01F 15/0438; E01F 15/02; E01F 15/06; E04H 17/06; E04H 17/08; E04H 17/10; E04H 17/12; E04H 12/22; Y10T 403/11
USPC ............................ 256/13.1, 47, 52; 404/6, 9
See application file for complete search history.

(56) References Cited

U.S. PATENT DOCUMENTS

| | | | |
|---|---|---|---|
| 1,722,994 A | 8/1929 | Burd | |
| 1,828,349 A | 10/1931 | Williams | |
| 2,244,042 A | 6/1941 | Barlow | |
| 2,561,206 A | 7/1951 | Kaspar | |
| 2,976,923 A | 3/1961 | Hirashiki | |
| 3,204,606 A | 9/1965 | Parr | |
| 3,307,833 A * | 3/1967 | Muller | E01F 15/06 256/13.1 |
| 3,350,039 A | 10/1967 | Crater | |
| 3,537,687 A | 11/1970 | Adelman | |
| 3,617,076 A | 11/1971 | Attwood | |
| 3,738,599 A | 6/1973 | Borehag | |

(Continued)

FOREIGN PATENT DOCUMENTS

| | | |
|---|---|---|
| AU | 199674061 | 6/1997 |
| CA | 2167548 | 7/1996 |

(Continued)

*Primary Examiner* — Amber R Anderson
*Assistant Examiner* — Nahid Amiri
(74) *Attorney, Agent, or Firm* — Greer, Burns & Crain, Ltd.

(57) ABSTRACT

A cable-barrier system that includes an anchor-body and terminal post which receive and retain one or more anchor-cables and are anchored to a footing to counter balance the force applied to the anchor body by one or more barrier-cables. The system also allows for the release of the anchor-cables during a collision by a vehicle.

14 Claims, 7 Drawing Sheets

(56) References Cited

U.S. PATENT DOCUMENTS

| | | |
|---|---|---|
| 3,776,520 A | 12/1973 | Charles et al. |
| 3,866,367 A | 2/1975 | Strizki |
| 3,912,404 A | 10/1975 | Katt |
| 3,932,958 A | 1/1976 | Kistler, Jr. et al. |
| 3,982,734 A | 9/1976 | Walker |
| 4,047,702 A | 9/1977 | Cernia et al. |
| 4,183,317 A | 1/1980 | Follick |
| 4,222,552 A | 9/1980 | Matteo, Sr. |
| 4,330,106 A | 5/1982 | Chisholm |
| 4,452,431 A | 6/1984 | Stephens et al. |
| 4,498,660 A | 2/1985 | Brema et al. |
| 4,655,434 A | 4/1987 | Bronstad |
| 4,674,911 A | 6/1987 | Gertz |
| 4,678,166 A | 7/1987 | Bronstad et al. |
| 4,681,302 A | 7/1987 | Thompson |
| 4,730,810 A | 3/1988 | Rambaud |
| 4,739,971 A | 4/1988 | Ruane |
| 4,844,424 A | 7/1989 | Knudslien |
| 5,022,782 A | 6/1991 | Gertz et al. |
| 5,039,066 A | 8/1991 | Stacey |
| 5,118,056 A | 6/1992 | Jeanise |
| 5,123,773 A | 6/1992 | Yodock |
| 5,207,302 A | 5/1993 | Popp et al. |
| 5,391,016 A | 2/1995 | Ivey et al. |
| 5,609,327 A | 3/1997 | Amidon |
| 5,664,905 A | 9/1997 | Thompson et al. |
| 5,797,591 A | 8/1998 | Krage |
| 5,820,110 A | 10/1998 | Beu |
| 5,851,005 A | 12/1998 | Muller et al. |
| 5,921,021 A | 7/1999 | Coates |
| 5,967,497 A | 10/1999 | Denman |
| 6,059,491 A | 5/2000 | Striefel et al. |
| 6,065,738 A | 5/2000 | Pearce et al. |
| 6,065,894 A | 5/2000 | Wasson et al. |
| 6,085,458 A | 7/2000 | Gau |
| 6,109,597 A | 8/2000 | Sicking et al. |
| 6,149,134 A | 11/2000 | Bank et al. |
| 6,173,943 B1 | 1/2001 | Welch et al. |
| 6,290,427 B1 | 9/2001 | Ochoa |
| 6,299,141 B1 | 10/2001 | Lindsay et al. |
| 6,398,192 B1 | 6/2002 | Albritton |
| 6,409,417 B1 | 6/2002 | Muller et al. |
| 6,488,268 B1 | 12/2002 | Albritton |
| 6,558,067 B2 | 5/2003 | Ochoa |
| 6,619,630 B2 | 9/2003 | Albritton |
| 6,719,483 B1 * | 4/2004 | Welandsson ........ E01F 15/0476 256/13.1 |
| 6,729,607 B2 | 5/2004 | Alberson et al. |
| 6,863,264 B2 | 3/2005 | Johansson et al. |
| 6,902,150 B2 | 6/2005 | Alberson et al. |
| 6,926,462 B1 | 8/2005 | Fuganti et al. |
| 6,932,327 B2 | 8/2005 | Alberson et al. |
| 6,948,703 B2 | 9/2005 | Alberson et al. |
| 6,962,328 B2 | 11/2005 | Bergendahl |
| 7,086,805 B2 | 8/2006 | Smith et al. |
| 7,216,854 B2 | 5/2007 | Bryan |
| 7,234,275 B1 | 6/2007 | Haggy et al. |
| 7,396,184 B2 | 7/2008 | La Turner et al. |
| 7,445,402 B1 | 11/2008 | Chen |
| 7,537,411 B2 | 5/2009 | Yodock, Jr. et al. |
| 7,699,293 B2 | 4/2010 | James |
| 7,722,282 B2 | 5/2010 | Meidan |
| 7,785,031 B2 | 8/2010 | Vellozzi et al. |
| 7,988,133 B2 * | 8/2011 | Gripne ................ E01F 15/025 256/13.1 |
| 8,915,486 B2 * | 12/2014 | James .................. E01F 15/06 256/13.1 |
| 2001/0013596 A1 | 8/2001 | Sicking et al. |
| 2001/0048846 A1 | 12/2001 | Ochoa |
| 2002/0025221 A1 | 2/2002 | Johnson |
| 2002/0179894 A1 | 12/2002 | Albritton |
| 2003/0222254 A1 | 12/2003 | Bergendahl |
| 2004/0140460 A1 | 7/2004 | Heimbecker et al. |
| 2005/0007507 A1 | 1/2005 | Ono et al. |
| 2005/0036832 A1 | 2/2005 | Smith et al. |
| 2005/0077508 A1 | 2/2005 | Bronstad |
| 2005/0047862 A1 | 3/2005 | Smith et al. |
| 2005/0063777 A1 | 3/2005 | Smith et al. |
| 2005/0077507 A1 | 4/2005 | Heimbecker et al. |
| 2006/0013650 A1 | 1/2006 | Meidan |
| 2006/0017048 A1 | 1/2006 | Alberson et al. |
| 2006/0054876 A1 | 3/2006 | LaTurner et al. |
| 2006/0102883 A1 | 5/2006 | Troutman et al. |
| 2007/0102689 A1 | 5/2007 | Alberson et al. |
| 2007/0252124 A1 | 11/2007 | Heimbecker |
| 2008/0000062 A1 | 1/2008 | Boltz |
| 2009/0146121 A1 | 6/2009 | Sharp et al. |

FOREIGN PATENT DOCUMENTS

| | | |
|---|---|---|
| EP | 0816568 | 1/1998 |
| EP | 0924348 | 6/1999 |
| EP | 1152104 | 11/2001 |
| EP | 1619308 | 1/2006 |
| EP | 1612333 | 4/2006 |
| FR | 2701046 | 8/1994 |
| FR | 2846673 | 5/2004 |
| NZ | 528396 | 2/2006 |
| SU | 1761854 | 9/1992 |
| WO | 1996029473 | 9/1996 |
| WO | 1998044203 | 10/1998 |
| WO | 1999032728 | 7/1999 |
| WO | 2003064772 | 8/2003 |
| WO | 2005028757 | 3/2005 |

\* cited by examiner

CABLE-BARRIERS

PRIORITY CLAIM

This application is a continuation of and claims priority to U.S. patent application Ser. No. 12/299,512 filed on Jan. 14, 2009, now U.S. Pat. No. 8,915,486, which claims priority to PCT Application No. PCT/NZ2007/000099 filed on May 4, 2007, which claims priority to New Zealand Patent Application Number 546970 filed on May 4, 2006, which are incorporated herein in their entireties.

TECHNICAL FIELD

The present invention relates to improvements in and relating to cable-barriers. In particular, though not solely, the present invention is directed towards an anchoring system for cable-barriers, for use in roading networks and/or vehicle road lanes requiring separation by a barrier.

BACKGROUND

The present invention will now be described in relation to cable-barriers for use in relation to roading networks. However, this should not be seen as limiting, as aspects of the present invention may also have application in relation to different fields.

Existing cable-barriers which employ a cable assembly as part of the barrier have a variety of different ways for anchoring the cable assembly to the ground, at the terminal ends of the cable-barrier. Typically, the cable(s) employed in the cable-barrier are guided through one or more terminal posts and are inclined towards one or more ground anchor points.

However, one problem with existing anchoring systems is that the inclined nature of the cable(s) at the terminal end of the barrier, together with the integrity of the anchoring system, acts to effectively create a ramp when impacted by an errant vehicle. As a result, the impacting vehicle either rolls or becomes at least partially airborne, following an impact.

Some existing cable-barriers, such as the cable-barrier system manufactured by Gibraltar, have attempted to overcome this 'ramping' problem by having their cables anchored to the ground via a quick release mechanism. Information regarding the Gibraltar system cable-barriers can be found on http://safety.fhwa.dot.gov/roadway_dept/road_hardware/index.htm.

However, one draw back of existing cable-barrier systems is that the anchoring systems only function in one direction. If a vehicle impacts the cable-barrier in the other or 'reverse' direction, snagging of the vehicle between the cables can occur, which in turn causes substantial damage to the vehicle and potentially more harm to the driver. Another drawback of existing cable-barriers is that if hit in the 'reverse' direction, ramping of the vehicle may still occur.

In the inventors experience, no such quick release mechanism has been fully effective at reducing or preventing an inclined cable anchoring system from acting as a ramp or snag, during impacts from a number of different angles, particularly 'reverse' direction impacts—these are impacts that occur in a direction other than a substantially head on impact.

It would therefore be useful to have a cable-barrier system or release mechanism that could withstand impact from collisions from both directions. Additionally, it would also be useful to have a cable-barrier which can release the anchor-cable downwardly extending from the terminal post of a cable-barrier, in situations where the anchor-cables are capable of acting as a ramp or snag during a collision.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

SUMMARY

The term 'cable-barrier' or grammatical variations thereof refers to a barrier that is constructed from one or more cables and a number of supporting posts.

The term 'terminal post' or grammatical variations thereof refers to the first post located at the first distal end of a cable-barrier.

For the purposes of this specification, the term 'anchor-body' or grammatical variations thereof refer to a portion of the terminal post which receives and retains one end of the anchor cable(s) to the terminal post.

The term 'anchor-cable' or grammatical variations thereof refer to the cable(s) that anchor the terminal post and/or the anchor-body to the ground.

The term 'barrier-cable' or grammatical variations thereof refer to the cable(s) that span the length of the cable-barrier.

The term 'snag', 'snagging' or other grammatical variations thereof refers to when a vehicle impacts the cable-barrier and causes the vehicle to become entangled between the anchor-cables and/or barrier-cables.

The term 'ramp' or grammatical variations thereof refer to when a vehicle impacts a barrier in a substantially head-on. This impact generally causes the vehicle to become airborne.

According to a first aspect of the present invention there is provided an anchor-body which includes at least one aperture adapted to, in use:
  receive and retain one or more anchor-cables which are anchored so as to counter balance the force applied to the anchor body by one or more barrier-cable(s); and
  release said anchor-cables from the aperture during a collision with a vehicle, in situations where said anchor-cables are capable of acting as a ramp and/or snag during said collision.

According to second aspect of the present invention there is provided an anchor-body for a terminal post of a cable-barrier;
  wherein said anchor-body is adapted to, in use:
  receive and retain one or more anchor-cables which are also anchored to a support surface so as to counter balance the force applied to the terminal post by one or more barrier-cable(s); and
  release said anchor-cables from the anchor-body, during a collision with a vehicle, in situations where said anchor-cables are capable of acting as a ramp and/or snag during said collision.

According to third aspect of the present invention there is provided a terminal post for a cable-barrier which includes:
  a cable-portion which has been adapted to, in use, receive and retain one or more barrier-cables used in the cable-barrier;
  characterised in that the post also includes an anchor-body which is adapted to, in use:
  receive and retain one or more anchor-cables which are anchored so as to counter balance the force applied to the terminal post by said barrier-cable(s); and
  release said anchor-cables, during a collision with a vehicle, in situations where said anchor-cables are capable of acting as a ramp and/or snag during said collision.

According to another aspect of the present invention there is provided an anchor-body for a terminal post of a cable-barrier;
  wherein said anchor-body is adapted to, in use:
  receive and retain one or more anchor-cables which are also anchored to a support surface so as to counter balance the force applied to the terminal post by said barrier-cable(s); and
  release said anchor-cables from the anchor-body, during a collision with a vehicle, in situations where said anchor-cables are capable of acting as a ramp and/or snag during said collision.

The cable-portion may be adapted in a variety of different ways so as to receive and retain one or more barrier-cables, when in use.

In general, the cable-portion may be in the form of one or more apertures through which the terminal end of a barrier-cable may pass.

In preferred embodiments the cable-portion may be in the form of a slot through which the terminal end of one or more barrier-cables may pass.

In further preferred embodiments the cable-portion may be a slot which has a mouth at the top end of the post.

The inventor has found an advantage with this embodiment is that any collision with the terminal post itself releases the barrier-cables which escape out the mouth of the slot when the post deforms. This in turn causes the anchor-cables to be released from the anchor-body.

The anchor-body may be adapted to receive and retain and release said anchor cable in a variety of different ways.

In general, the anchor-body includes an aperture into which, in use, anchor-cables may pass and be retained therein, wherein said aperture is adapted to release said anchor-cables upon application of a force.

In some embodiments the aperture may include a frangible portion which will break off upon application of a force, so said anchor-cables can exit the anchor-body.

In preferred embodiments, the aperture of the anchor-body, into which, in use, anchor-cables may pass and be retained therein, may be in the form of a slot which includes a mouth at one end thereof through which said anchor-cables may exit upon application of a force, to release said anchor-cables from the anchor-body.

Preferably, the force applied to the anchor-body, anchor-cables or barrier-cables may be applied to the anchor-body in a substantially downward direction with respect to the anchor-cables. In other embodiments, the force may be applied to the anchor-body in a substantially side-on direction with respect to the anchor-cables. While, in even further embodiments, the force applied to the anchor-body may be in a substantially downward and side-on direction with respect to the anchor-cables.

In further preferred embodiments the anchor-body may also include at least two arms which can extend the anchor-body out from the post. In use the arms position the anchor-body on the post so it faces substantially the opposite direction to the force applied by the barrier-cables to the post, away from the barrier-cables.

According to another aspect of the present invention there is provided a kit for erecting a terminal post for cable-barrier system wherein the kit includes:
  at least one terminal post which includes a cable-portion which has been adapted to, in use, receive and retain one or more barrier-cables used in the cable-barrier; and
  an anchor-body which forms part of the terminal post, or which can be attached to said terminal post;
  wherein said anchor-body is adapted to, in use:
  receive and retain one or more anchor-cables which are anchored so as to counter balance the force applied to the terminal post by said barrier-cable(s); and
  release said anchor-cables, during a collision with a vehicle, in situations where said anchor-cables are capable of acting as a ramp and/or snag during said collision.

According to another aspect of the present invention there is provided a cable-barrier system which includes:
  at least one terminal post, as substantially described above, which includes a cable-portion which has been adapted to, in use, receive and retain one or more barrier-cables used in the cable-barrier; and an anchor-body, as substantially described above, which forms part of the terminal post, or which can be attached to said terminal post;

wherein the cable-barrier system further includes;

a plurality of posts capable of receiving and retaining at least one cable therein;

one or more barrier-cables retained within the posts.

According to another aspect of the present invention there is provided a method of anchoring a cable-barrier to a support surface characterised by the steps of:

a) connecting one end of at least one anchor-cable to an anchor-body on a terminal post of the cable-barrier;

b) anchoring the other end of the anchor-cable(s) to the support surface, wherein said anchor-body is adapted to, in use:

receive and retain one or more anchor-cables which are anchored so as to counter balance the force applied to the terminal post by said barrier-cable(s); and release said anchor-cables, during a collision with a vehicle, in situations where said anchor-cables are capable of acting as a ramp and/or snag during said collision.

The anchor-cable(s) may be anchored to the support surface in a variety of different ways.

In general, the anchor-cable(s) may be anchored to the support surface in a manner which reduces any substantially upward force exerted by the anchor-cable at the anchor point(s).

In preferred embodiments, the anchor-cable(s) may be attached to:

a strut running substantially parallel to the support surface, and which may be connected to the ground; and at least two points along a strut, such that at least some of any substantially upward force can be converted to a sheer force which is substantially parallel to the longitudinal axis of the strut.

Preferably, the anchor-cables may be connected at two or more points along the strut.

Preferably, the strut prevents the mid-point of the anchor-cables from lifting away from the ground upon application of a force.

Thus, it should be appreciated that preferred embodiments of the present invention may have a number of advantages over the prior art which can include:

providing a terminal post for, and/or method of anchoring, a cable-barrier which can release anchor-cable downwardly extending from the terminal post of a cable-barrier, in situations where said anchor-cables are capable of acting as a ramp and/or snag during a collision;

a barrier-cable release mechanism on a terminal post of a cable-barrier which releases barrier-cables when a vehicle collides with the terminal post and/or anchor-cables of the cable-barrier;

A barrier-cable release mechanism that can withstand impact from collisions from both directions.

BRIEF DESCRIPTION OF DRAWINGS

Further aspects of the present invention will become apparent from the following description which is given by way of example only and with reference to the accompanying drawings in which.

DETAILED DESCRIPTION

Figure 1:
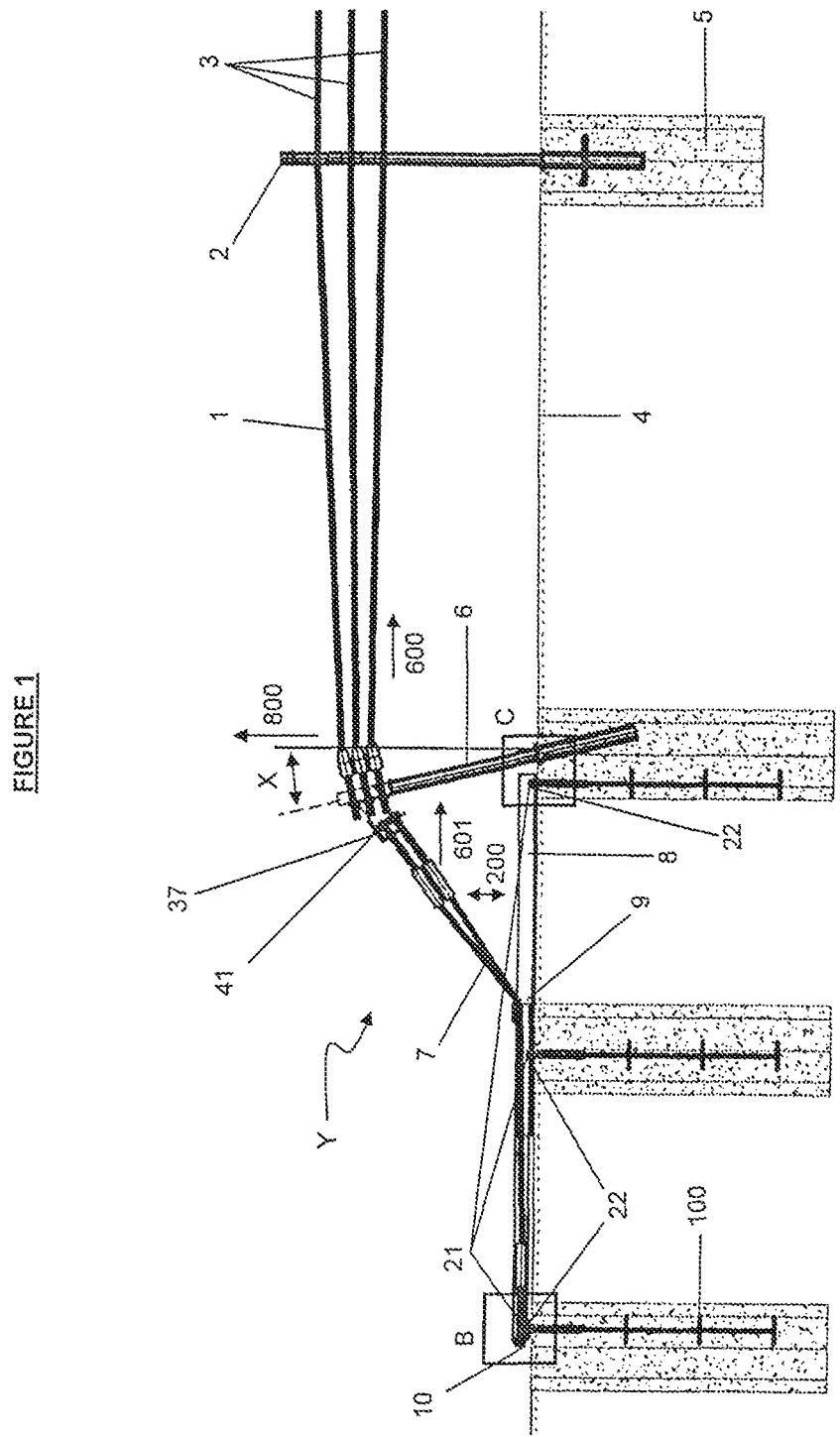
FIG. 1 shows a partial side elevation view of a cable-barrier in accordance with the preferred embodiment of the present invention.
Figure 2:
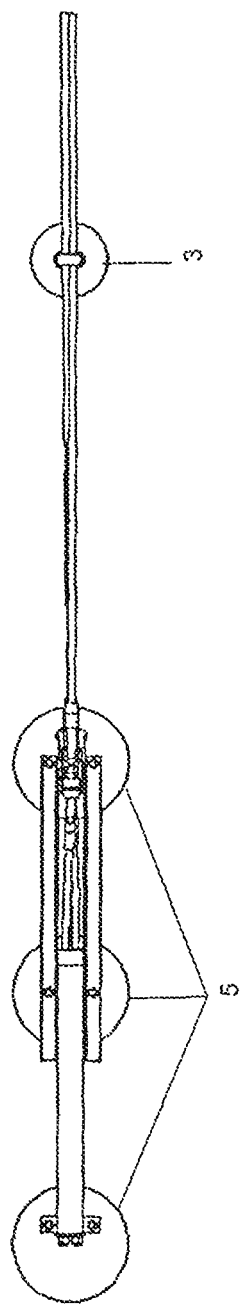
FIG. 2 shows a corresponding plan elevation view of the cable-barrier, as shown in FIG. 1.
Figure 3:
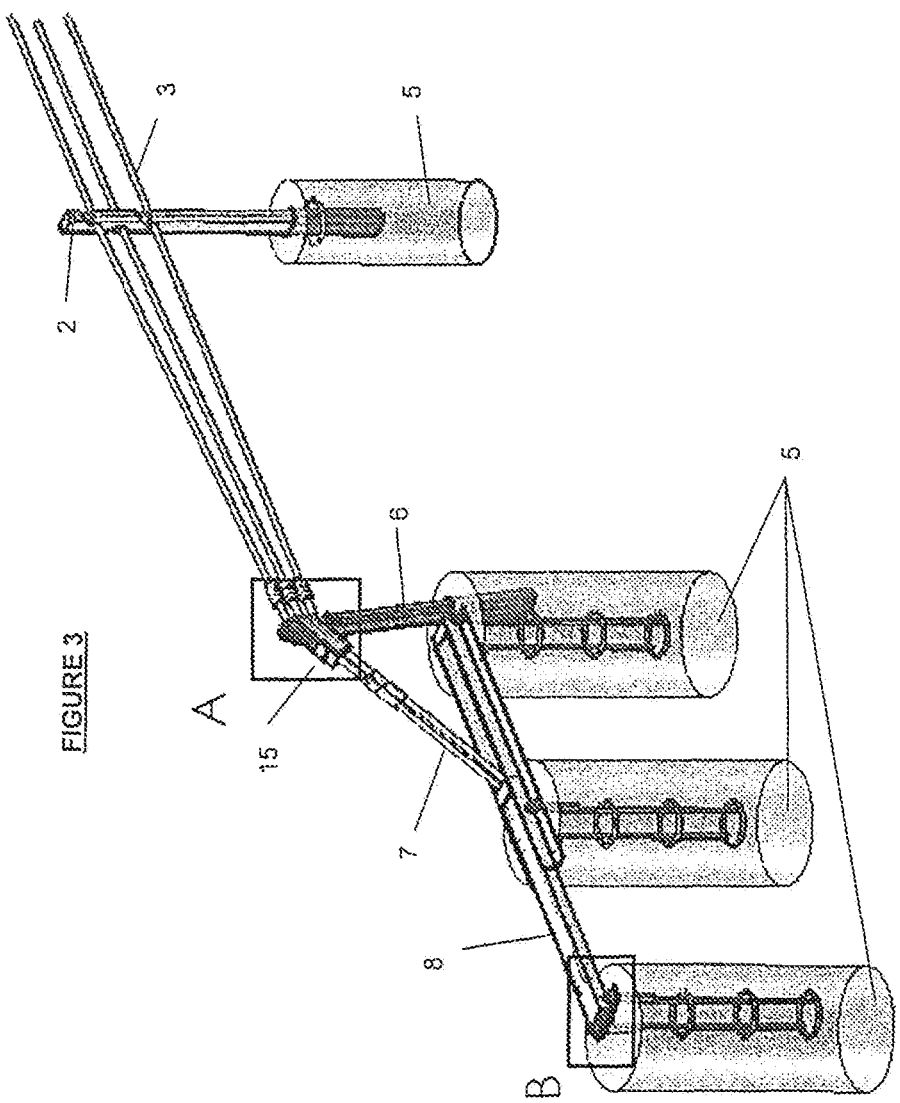
FIG. 3 shows a further perspective elevation view of a cable-barrier in accordance with the preferred embodiment of the present invention.
Figure 7:
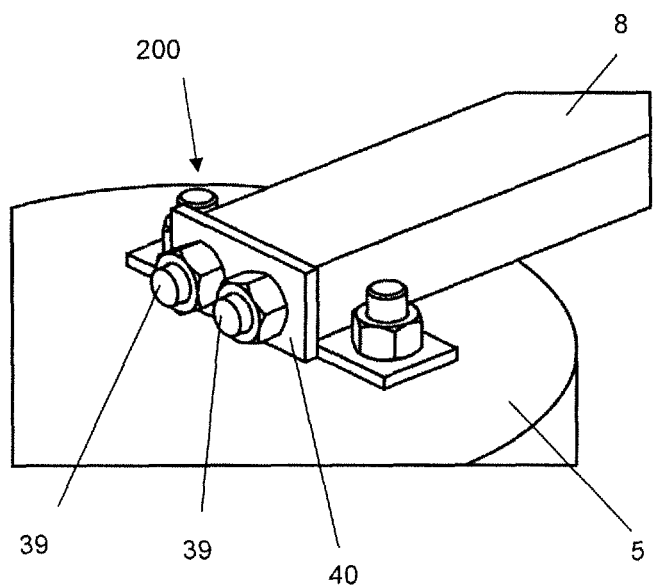
FIG. 7 shows a detail view of the distal end of the ground strut connection, as indicated by box B in FIG. 3.

FIGS. 1 to 3 show a cable-barrier (1). The cable-barrier (1) includes a plurality of posts (2) (of which only one is shown) which support the cables (3) of the cable barrier (1). The posts (2) are secured to the ground (4) via concrete footings (5). The cable-barrier (1) also includes a terminal post (6) which is also secured to the ground (4) via a concrete footing (5). The terminal post (6) is at an angle of approximately 8 degrees to the vertical, as indicated by double ended arrow X. The terminal post (6) is further secured to the ground (4) via two anchor-cables (7) which are connected to the ground (4) via a strut (8) which runs parallel to the surface of the ground (4) and is attached thereto via bolts (indicated by line 21 on FIG. 1) which are connected to threadable socket portions (indicated by line 22 on FIG. 1) of reinforcing elements (100) embedded in the concrete footings (5). As shown in FIGS. 1 to 3, the anchor-cables (7) travel through the hollow centre of the strut (8) from an entry point (9) to the terminal end of the strut (10) where the anchor-cables (7) are secured by a bolt (39) and washer (40) arrangement (as indicated by Box B in FIGS. 1 and 3). The bolt and washer arrangement is shown in detail in FIG. 7.

Figure 4:
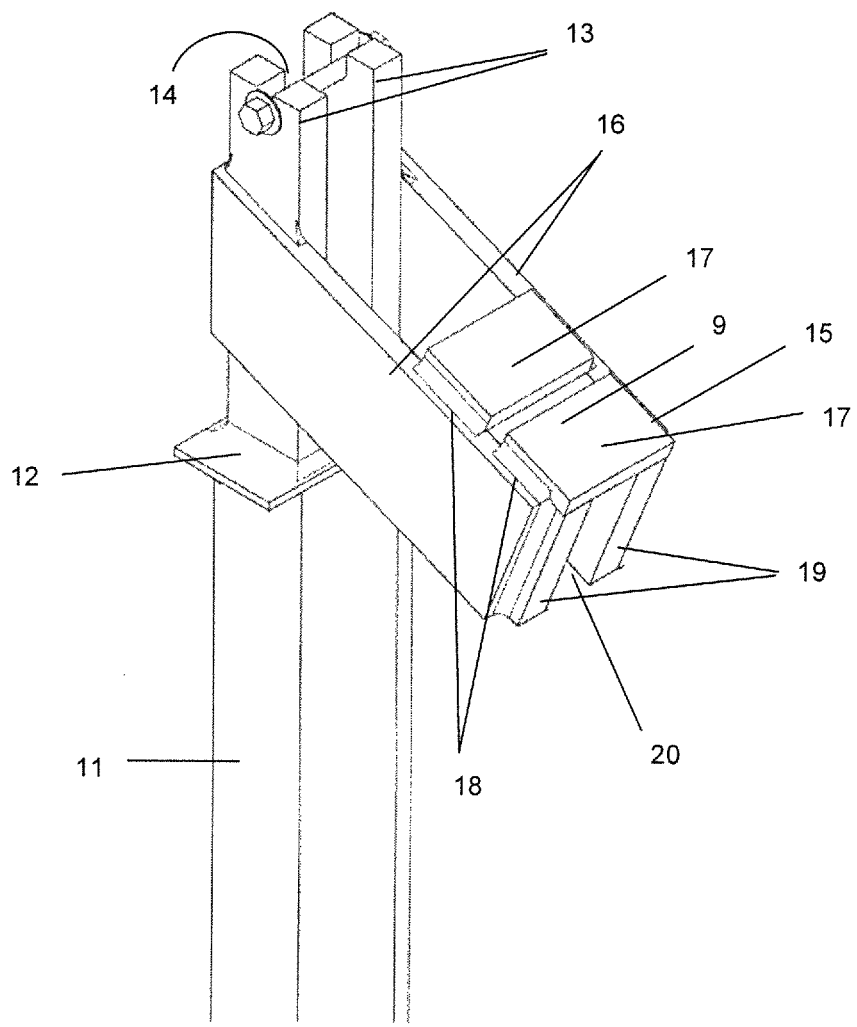
FIG. 4 shows a perspective elevation view of the top of the terminal post shown in FIG. 1 without any cables attached thereto.
Figure 5:
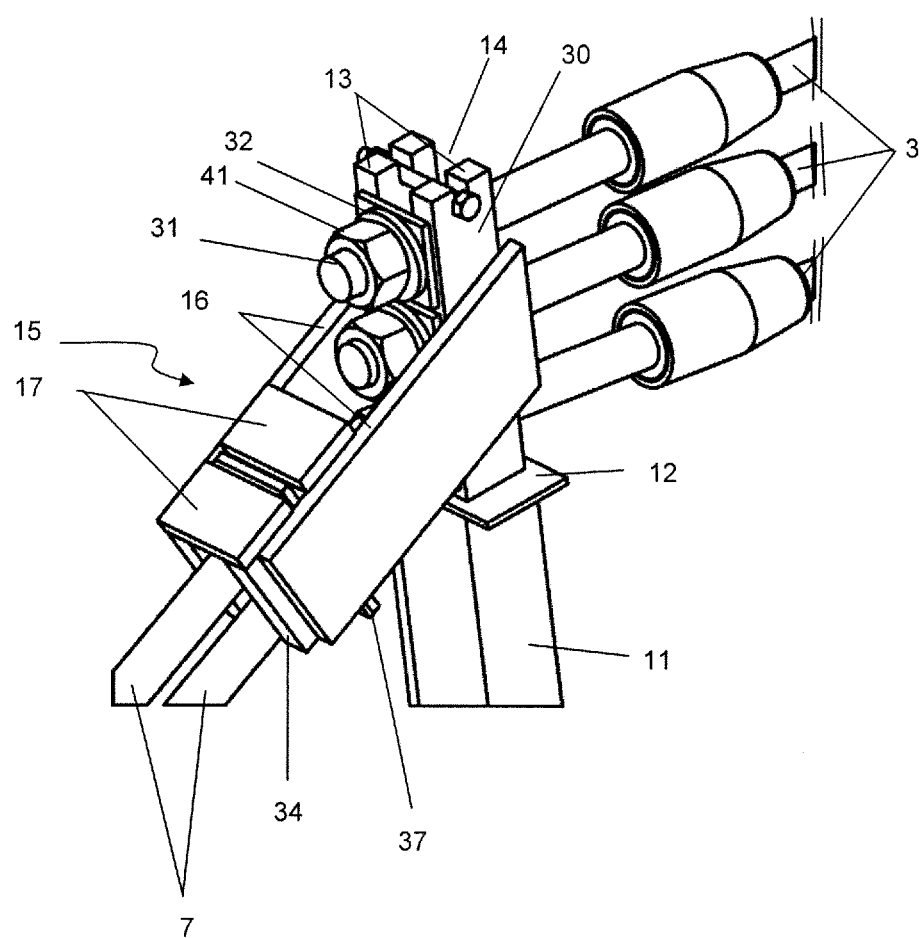
FIG. 5 shows a perspective elevation view of the top portion of the terminal post (as indicated by Box A in FIG. 3) with cables and anchor-cables attached thereto.

The terminal post and anchor body arrangement, of the cable-barrier, as specifically indicated by Box A on FIG. 3, is shown in greater detail in FIGS. 4 and 5.

The terminal post (6) has a substantially upright portion (11) and a post transition plate (12) which is welded on top of upright portion (11). Additionally, two vertical strain plates (13) are welded to the post transition plate (12). The strain plates (13) form a cable-portion in the form of a slot (14).

Also shown in FIGS. 4 and 5 is an anchor-body (15). The anchor-body (15) has two side plates (16) which are respectively attached to the outside of the two vertical strain plates (13). The two side plates (16) are connected to one another via two top plates (17) which are also respectively welded (indicated by line 18). At the distal end of the side plates (16) two further plates (19) are welded together, which form an aperture (20).

FIG. 5 show the terminal post (6) and anchor-body (15) in an in use position, within a cable-barrier system. As shown, the terminal ends of cables (3) include a threaded section (30) which passes through the slot (14) of the cable-portion. To retain the cables within the threaded section (30), the cables (3) are secured within slot (14) via nuts and bolts (31) and a washer (32). Additionally, the anchor-cables (7) are retained within a threaded section (34) which passes through aperture (20) in the anchor-body. Similarly, the anchor-cables (7) are retained therein via a washer (37) and nuts (41).

Figure 6:
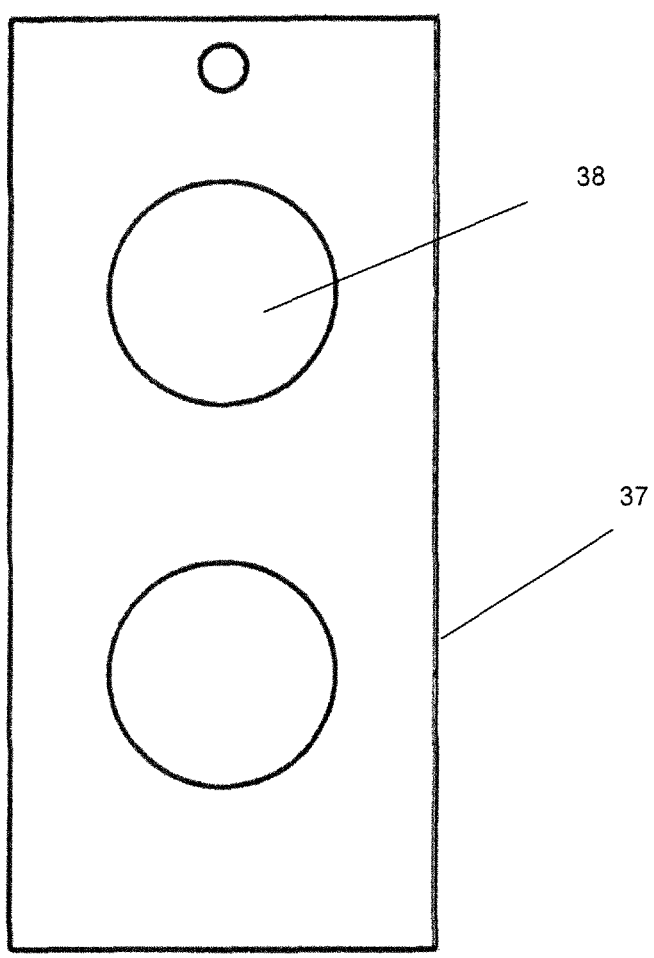
FIG. 6 shows a front elevation view of the anchor-body washer.

FIG. 6 shows the washer for the anchor-cables (7) in greater detail. As indicated, the washer (37) has two apertures (38) through which the threaded sections of the anchor-cables (7) can pass through and be retained in.

In use, if a vehicle travelling in direction Y hits or contacts the anchor-cables (7) the resultant force from the impact moves the anchor-cables (7) substantially in the direction of arrow (200) which releases the anchor-cables (7) from the anchor-body (15).

As the cables (3) of the cable-barrier (1) are held under tension in the direction of arrow (600) the release of the anchor-cables (7) causes the terminal post (6) to deform substantially in the direction of arrow (601) and as a consequence the cables (3) move in a substantially vertical direction as indicated by arrow (800) and are released from slot (14) of the cable portion.

A similar net result occurs if a vehicle impacts into the terminal post (6) itself as any substantial deformation of the terminal post (6) causes the respective release of the cables (3) and/or anchor-cables (7) from the slot (14) of the cable-portion of the terminal post or the aperture (20) of the anchor-body (15). This is the outcome of when a vehicle impacts the anchor-cables (7), the terminal post (6) or anchor-body (15) substantially side-on. Here, the force causes the terminal post (6) and anchor-body (15) to twist or buckle, due to the opposing forces between the cable tension and direction of force caused by the impact.

Aspects of the present invention have been described by way of example only and it should be appreciated that modifications and additions may be made thereto without departing from the scope thereof as defined in the appended claims.

What I claim is:

1. A terminal post for a cable barrier which includes:
a post member comprising a cable-portion including an aperture which has been adapted to, in use, receive and retain one or more barrier-cables used in the cable barrier;
an anchor-body attached to the post member at, or proximate, the upper end of the post member and extending outwardly from the post member, and including a slot which is adapted to, in use, receive and retain one or more anchor-cables which are anchored to a footing in a support surface so as to counter balance the force applied to the post member by said one or more barrier-cables,
wherein said slot of the anchor-body includes a mouth that opens downwardly to release said anchor-cables downwards upon said anchor-cables experiencing a force as a result of a collision by a vehicle.

2. The terminal post as claimed in claim 1, wherein said post member is configured to release said one or more barrier-cables upon release of said one or more anchor-cables.

3. The terminal post as claimed in claim 1, wherein the aperture of the cable-portion is a slot having a mouth at the top end of the post member that is configured to release said one or more barrier-cables upwards upon release of said one or more anchor-cables from the anchor body downwards.

4. The terminal post as claimed in claim 1, wherein the anchor-body includes at least two arms which extend the anchor-body out from the post.

5. The terminal post as claimed in claim 4, wherein the at least two arms position the anchor-body on the post member so the anchor body extends out from the post member on substantially the opposite side of the post member to said one or more barrier-cables.

6. A kit for erecting a terminal post for a cable barrier system wherein the kit includes:
at least one terminal post which includes a post member comprising a cable-portion including an aperture which has been adapted to, in use, receive and retain one or more barrier-cables used in the cable barrier system; and
an anchor-body which forms part of the post member, or which can be attached to said post member, at or proximate the upper end of the post member and extending outwardly from the post member;
wherein said anchor-body includes a slot adapted to, in use, receive and retain one or more anchor-cables which are anchored to a footing in a support surface so as to counterbalance the force applied to the terminal post by said one or more barrier cables, and
wherein said slot of the anchor-body includes a mouth that opens downwardly to release said one or more anchor-cables downwards upon said one or more anchor-cables experiencing a force as a result of a collision by a vehicle.

7. A method of anchoring a cable barrier to a footing in a support surface characterized by the steps of:
a) connecting one end of at least one anchor-cable to an anchor-body on a terminal post at, or proximate, the upper end of the terminal post;
b) anchoring the other end of said at least one anchor-cable to the footing;
wherein said terminal post includes a post member comprising a cable-portion including an aperture which has been adapted to, in use, receive and retain one or more barrier-cables used in the cable barrier; and
wherein said anchor-body is attached to said post member at, or proximate, the upper end of the post member and extends outwardly from the post member, and including a slot adapted to, in use, receive and retain said at least one anchor-cable so as to counter balance the force applied to the terminal post by said one or more barrier-cables, and
wherein said slot of the anchor-body includes a mouth that opens downwardly to release said at least one anchor-cable downwards upon said at least one anchor-cable experiencing a force as a result of a collision by a vehicle.

8. A cable-barrier system which includes:
a terminal post member including a post member comprising a cable-portion comprising an aperture;
a plurality of barrier posts;
one or more barrier-cables received and retained by the aperture in the cable portion and by the plurality of barrier posts;
an anchor-body attached to the post member of the terminal post at, or proximate, the upper end of the terminal post member and extending outwardly from the post member, and including a slot; and
one or more anchor-cables received and retained by the slot in the anchor body and anchored to a footing in a support surface so as to counter balance force applied to the terminal post member by said one or more barrier-cables,
wherein said slot of the anchor-body includes a mouth that opens downwardly to release said anchor-cables downwards upon said anchor-cables experiencing a force as a result of a collision with a vehicle.

9. The cable barrier system as claimed in claim 8, wherein said one or more anchor-cables are anchored to one or more respective anchor points at the support surface and, in use, exert a partially upward and partially horizontal force at said one or more anchor points.

10. The cable barrier system as claimed in claim 8, wherein the one or more anchor-cables are attached to a strut running substantially parallel to the support surface, and which is connected to the ground, and wherein each of said one or more anchor cables is attached to said strut such that at least some of any substantially upward force is converted to a shear force which is substantially parallel to the longitudinal axis of the strut.

11. The cable barrier system as claimed in claim 8, further comprising a strut that prevents the mid-point of said one or more anchor-cables from lifting away from the ground upon application of a force.

12. The cable barrier system as claimed in claim 8, wherein the slot is adapted to release said anchor-cables upon said anchor-cables experiencing a substantially horizontal force as a result of a collision with a vehicle.

13. The cable barrier system as claimed in claim 8, wherein the slot is adapted to release said anchor-cables upon said anchor-cables experiencing a substantially downward force as a result of a collision with a vehicle.

14. The cable barrier system as claimed in claim 8, wherein the slot is adapted to release said anchor-cables upon said anchor-cables experiencing a substantially downward and horizontal force as a result of a collision with a vehicle.

* * * * *